US012103551B2

(12) United States Patent
Conigliaro

(10) Patent No.: US 12,103,551 B2
(45) Date of Patent: Oct. 1, 2024

(54) METHOD FOR THE PERFORMANCE-ENHANCING DRIVER ASSISTANCE OF A ROAD VEHICLE AND RELATED ROAD VEHICLE

(71) Applicant: FERRARI S.p.A., Modena (IT)

(72) Inventor: Vito Conigliaro, Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 17/933,498

(22) Filed: Sep. 20, 2022

(65) Prior Publication Data

US 2023/0093845 A1  Mar. 30, 2023

(30) Foreign Application Priority Data

Sep. 30, 2021 (IT) ........................ 102021000025022

(51) Int. Cl.
*B60W 50/14* (2020.01)
*B60K 35/00* (2024.01)
(Continued)

(52) U.S. Cl.
CPC ............ *B60W 50/14* (2013.01); *B60K 35/00* (2013.01); *B60W 40/072* (2013.01); *B60K 35/23* (2024.01); *B60K 35/265* (2024.01); *B60K 35/28* (2024.01); *B60K 35/29* (2024.01); *B60K 2360/1868* (2024.01); *B60K 2360/188* (2024.01);
(Continued)

(58) Field of Classification Search
CPC ............................ B60W 50/14; B60W 40/072
See application file for complete search history.

(56) References Cited

U.S. PATENT DOCUMENTS

| 2019/0255813 A1* | 8/2019 | Bauerle ................. F21S 45/50 |
| 2021/0171018 A1 | 6/2021 | Secondi |
| 2021/0276422 A1 | 9/2021 | Masoero et al. |

FOREIGN PATENT DOCUMENTS

| DE | 102004030997 A1 | 1/2006 |
| DE | 102015203727 A1 | 9/2016 |

(Continued)

OTHER PUBLICATIONS

Espacenet of English translation of EP 3138752A2. (Year: 2017).*
Search Report for Italian Application No. 102021000025022 completed Apr. 15, 2022.

*Primary Examiner* — Nabil H Syed
*Assistant Examiner* — Cal J Eustaquio
(74) *Attorney, Agent, or Firm* — CANTOR COLBURN LLP

(57) ABSTRACT

A method for the performance-enhancing driver assistance of a road vehicle on a track comprising the steps of: determining, in use, the current position and the current orientation of the road vehicle on the track by means of a tracking device; identifying an optimal trajectory in relation to the conformation of the track and/or to the road vehicle; determining, in use, a relative position of the road vehicle with respect to the optimal trajectory by identifying a longitudinal relative position on the optimal trajectory; suggesting to the driver, by means of one or more colours emitted or assumed by a light interface device, depending on the longitudinal relative position, one or more actions to be performed to vary a longitudinal dynamic of the road vehicle in order to perform a mission optimising the performance on the track.

15 Claims, 14 Drawing Sheets

(51) Int. Cl.
*B60K 35/23* (2024.01)
*B60K 35/26* (2024.01)
*B60K 35/28* (2024.01)
*B60K 35/29* (2024.01)
*B60W 40/072* (2012.01)

(52) U.S. Cl.
CPC .. *B60K 2360/332* (2024.01); *B60W 2050/143* (2013.01); *B60W 2050/146* (2013.01); *B60W 2552/30* (2020.02)

(56) References Cited

FOREIGN PATENT DOCUMENTS

| EP | 1693242 A2 * | 8/2006 | ......... B60K 31/0066 |
|---|---|---|---|
| EP | 3138752 A2 | 3/2017 | |
| WO | WO-2015086267 A1 * | 6/2015 | .......... B60W 30/095 |

\* cited by examiner

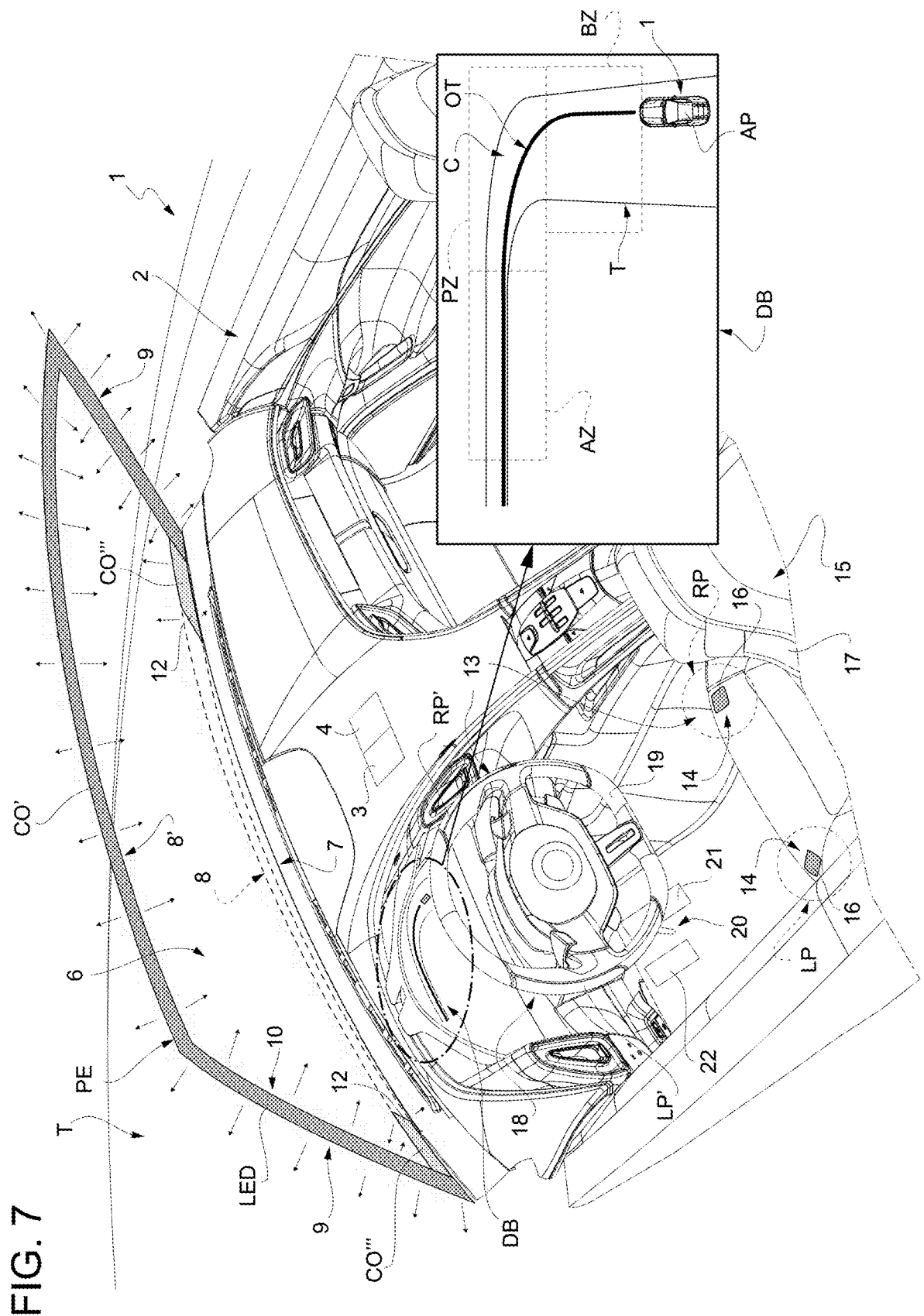

METHOD FOR THE PERFORMANCE-ENHANCING DRIVER ASSISTANCE OF A ROAD VEHICLE AND RELATED ROAD VEHICLE

CROSS-REFERENCE TO RELATED APPLICATIONS

This patent application claims priority from Italian patent application no. 102021000025022 filed on Sep. 30, 2021, the entire disclosure of which is incorporated herein by reference.

TECHNICAL SECTOR

The invention relates to a method for the performance-enhancing driver assistance of a road vehicle and to a related road vehicle.

PRIOR ART

Generally speaking, the performances of a vehicle (speed, times, consumptions, mileage, etc.) are not maximized because of different elements (limits set by the law, driver's ability, atmospheric conditions, . . . ).

For example, speed limits on roads open to traffic are much lower than the actual performances offered by a car, especially in case of a high-performance sports car. As a consequence, when normally driving on a road, only a small part of the actual capacities of a high-performance sports car is used. For this reason, it frequently happens that the owner of a high-performance sports car occasionally decides to make some laps on a track, so as to try and fully enjoy the performances offered by the car. However, for an inexperienced driver, high-performance driving on a track can definitely very complicated, since it is completely different from everyday driving on roads open to traffic. In particular, an inexperienced driver can have a very hard time understanding the actual limits of the car and, as a consequence, there is, on the one hand, the chance that the performances of the car are not completely exploited and, on the other hand, there is the risk of going off the road, which is potentially dangerous both for the integrity of the car and for the safety of the driver.

Furthermore, an inexperienced driver might not be aware of the ideal trajectories to be followed in order to optimize track times.

In recent years, for driver assistance, many electronic assistance devices (for instance, anti-lock braking systems or ABS, traction control systems or ASR, stability control . . . ) were developed, which change the commands given by the driver depending on the actual limits of the car. However, the frequent intervention of said electronic driver assistance devices reduces the extent to which high-performance driving can be enjoyed and, therefore, their continuous interferences turn out to be fairly frustrating for a track driver. Hence, in some known cases, manufacturers introduced informative messages (for example, on when to shift gear or on the occurrence of given conditions), which are delivered by the vehicle to the driver through interfaces (for example, a screen) arranged on the dashboard of the vehicle so as to allow the driver to personally carry out the actions, thus increasing the driving pleasure.

However, these solutions distract the driver from the road ahead, since, in order to acknowledge the information given, he/she has to directly focus on the interface, thus temporarily looking away (or removing the focus, in case of a head-up display) from the track and generating a temporary interruption in the perceiving of the position on the track. In particular, a head-up display is hard to be used to indicate the trajectory to be followed, as the look, when driving along a curve, should generally be aimed at the apex point of the curve and not in a longitudinal direction (towards the head-up display).

In other cases, the driver is subjected to coaching lessons, both from a theoretical and from a practical point of view, during which a coach (for example, sitting on the passenger's seat) provides the driver with a plurality of items of information to improve track performances. However, even in this case, the presence of the coach distracts or stresses the driver, makes the vehicle heavier and requires the coach to be available as well as the driver to make reservation, thus hindering an optimized and autonomous learning of the driver. Furthermore, in these cases, the coach teaches the driver how to use references on the track (for example, a sign, a tree, a curb, etc.) as indications to perform a given action (for example, a gear shift, a brake, etc.); these references, however, determine a strong subjectivity and, anyway, the search for them at least partially distract the driver from driving.

DESCRIPTION OF THE INVENTION

The object of the invention is to provide a method for the performance-enhancing driver assistance of a road vehicle as well as a related road vehicle, which are at least partially free from the drawbacks described above and, at the same time, are simple and economic to be carried out and manufactured.

According to the invention, there are provided a method for the performance-enhancing driver assistance of a road vehicle and a related road vehicle according to the appended claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein:

FIG. 7 is a schematic perspective view, with details left out for greater clarity, of the view from the inside of a passenger compartment in a second embodiment;

PREFERRED EMBODIMENTS OF THE INVENTION

Figure 1:
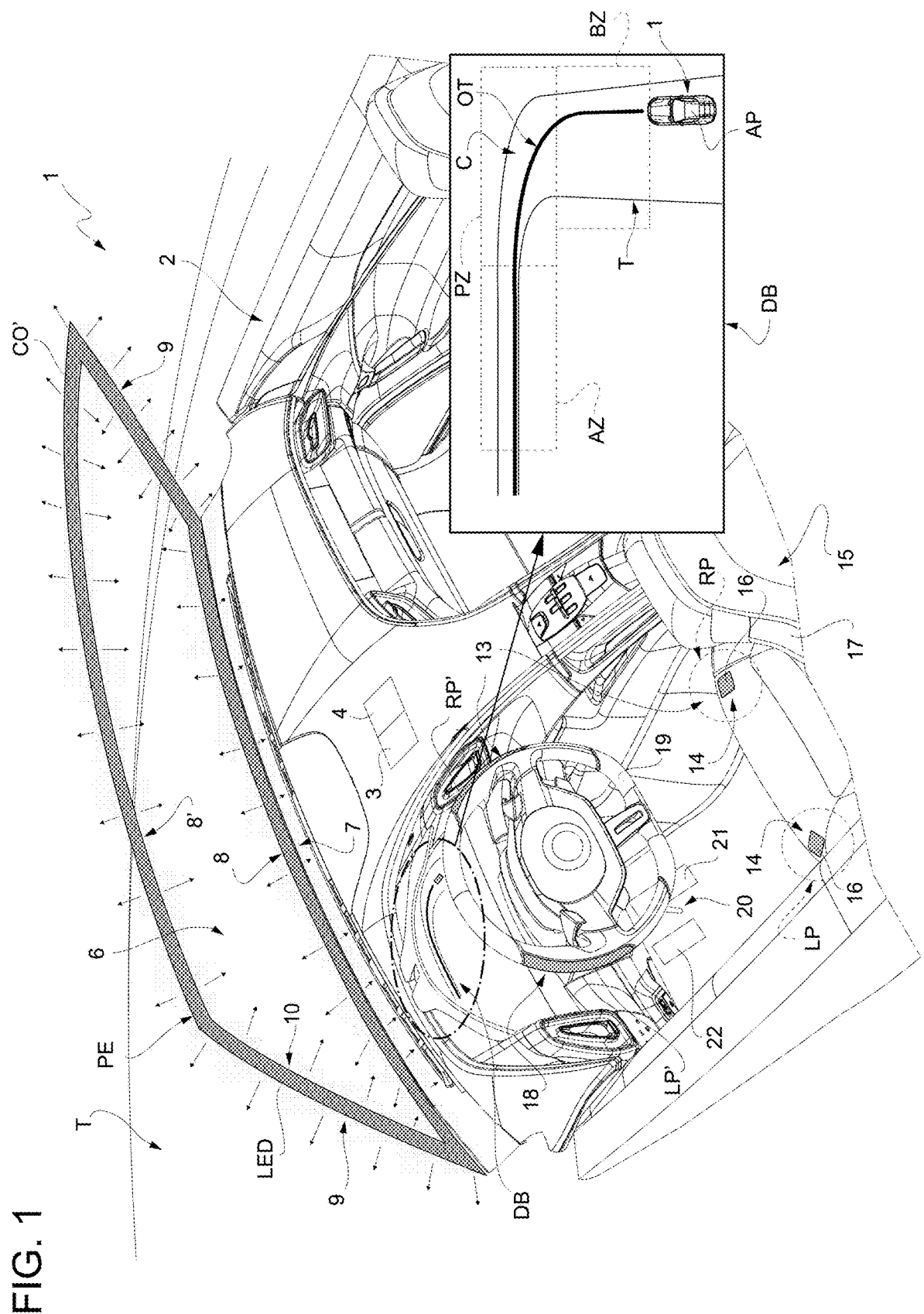
FIG. 1 is a schematic perspective view, with details left out for greater clarity, of an inner portion of a road vehicle according to the invention driving along a stretch of track.

In FIG. 1, number 1 indicates, as a whole, a road vehicle driven by a driver (who is not shown for the sake of simplicity) and provided with two front wheels and with two rear wheels (in particular, drive wheels). The vehicle 1 is provided with a passenger compartment 2, which is designed to accommodate the driver and possible passengers.

The road vehicle 1 comprises a tracking device 3, which is configured to identify a current position AP and a current orientation of the road vehicle 1. In particular, the tracking device 3 can be any tracking device, for example a tracking device using radio waves with a short range (e.g. ARVA® or RECCO®) or with a long range (GPS) or a laser tracking device (LIDAR) or an optical tracking device (cameras). In some non-limiting cases, the tracking device 3 comprises a device designed to detect the position AP of the road vehicle 1 and processes the orientation of the vehicle based on the direction in which it moves and on the position of the front wheels. In other non-limiting cases, the tracking device 3 comprises both the device configured to detect the position AP of the road vehicle 1 and a device configured to detect the space orientation thereof (for example, an electronic three-axis compass).

Advantageously, the road vehicle 1 further comprises a control unit 4 (which is known and, therefore, not described in detail) configured to at least partially (in particular, totally) determine the conformation of a track T on which the road vehicle 1 is located (for example, by means of ADAS devices or by accessing a dedicated database) and to identify an optimal trajectory OT in relation to the conformation of the track T and/or the road vehicle 1 (according to known methods, which, therefore, are not described in detail). The control unit 4 can physically consist of one single device or of several devices separate from one another and communicating with one another through the CAN network of the road vehicle 1.

Preferably, the control unit 4 is configured to determine, in use, a relative position of the road vehicle 1 with respect to the optimum trajectory OT by identifying a longitudinal relative position on the optimum trajectory OT. In other words, the control unit 4 is configured to determine the linear point of the optimal trajectory OT on which the road vehicle 1 is located (or would be located by transversely/horizontally translating it on the track T). In this way, it is possible to determine the position of the road vehicle 1 on the or with respect to the optimal trajectory OT, so that it is possible to understand in which zone of the trajectory the road vehicle 1 is located. In particular, according to the non-limiting embodiment of FIG. 1, the optimal trajectory OT (namely, the track T) is divided into zones BZ, PZ, AZ through which the road vehicle 1 drives.

Advantageously, the road vehicle 1 comprises a light interface device 5 configured to suggest to the driver one or more actions to be performed to vary the longitudinal dynamic (for example, longitudinal speed and acceleration) of the road vehicle 1 so as to perform a mission that optimises track performance T (namely, reduces lap times). In the non-limiting embodiments of the accompanying figures, the actions to be performed in order to vary the longitudinal dynamic, which are suggested by the light interface device 5 of the road vehicle 1, are braking (namely, the braking point before a curve), partialisation (namely, adjusting the pressing of the accelerator pedal 21 when exiting a curve) and possibility of maximum acceleration (namely, pressing the accelerator pedal 21 all the way down).

Advantageously, though not necessarily, the light interface device 5 is arranged so as not to obstruct the view of the road vehicle for the driver. In other words, the light interface device 5 is not arranged between the eyes of the driver and a windscreen 6 of the road vehicle 1.

Advantageously, though not necessarily, the light interface device 5 is configured to be perceived by the driver without having to be directly looked at; in particular, without having to (ever) look away from the track T or look at the interface device 5. In other words, the light interface device 5 is configured to transmit suggestions that can be perceived by the driver without looking away from or removing the focus from the track T (for example, from the next apex point).

In particular, the light interface device 5 is configured to emit or assume one or more colours depending on the relative position of the road vehicle (namely, on its current position AP within the track T and/or on the trajectory OT).

According to some non-limiting embodiments, like the one shown in FIGS. 1, 3 and 8a-8e, the interface device 5 is configured to light up with a first colour CO' (preferably, red) in an optimal braking zone (FIGS. 1 and 3), in particular approaching a curve C. In detail, the term "braking" means, in the automotive industry, a strong and quick deceleration (for example, after a straight stretch of road and before entering a curve), which, in order to gain time, is delayed to the last possible moment. Preferably, though not necessarily, the interface device 5 preserves the first colour CO' for the entire length of the braking zone BZ, namely the entire time the driver has to press the brake pedal 22.

Figure 5:
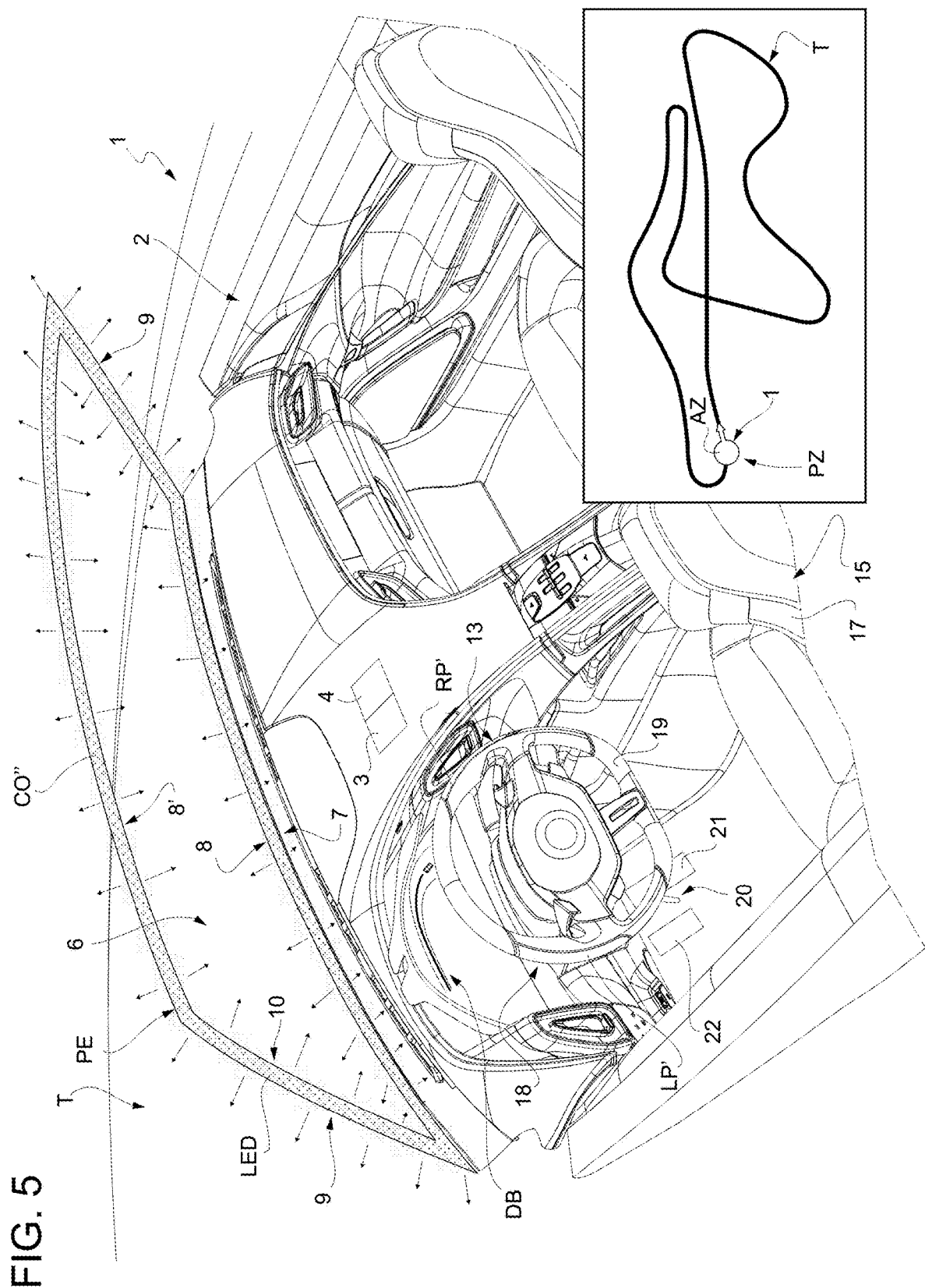

Alternatively or in addition and according to the non-limiting embodiment of FIG. 5, the interface device 5 is configured to light up with a second colour CO" (preferably, yellow) in an optimal partialisation zone PZ (FIG. 5), in particular when exiting a curve. Preferably, though not necessarily, the interface device 5 preserves the second colour CO" for the entire length of the partialisation zone PZ, namely the entire time the driver has to adjust with moderation the pressing of the accelerator pedal 21.

Figure 2:
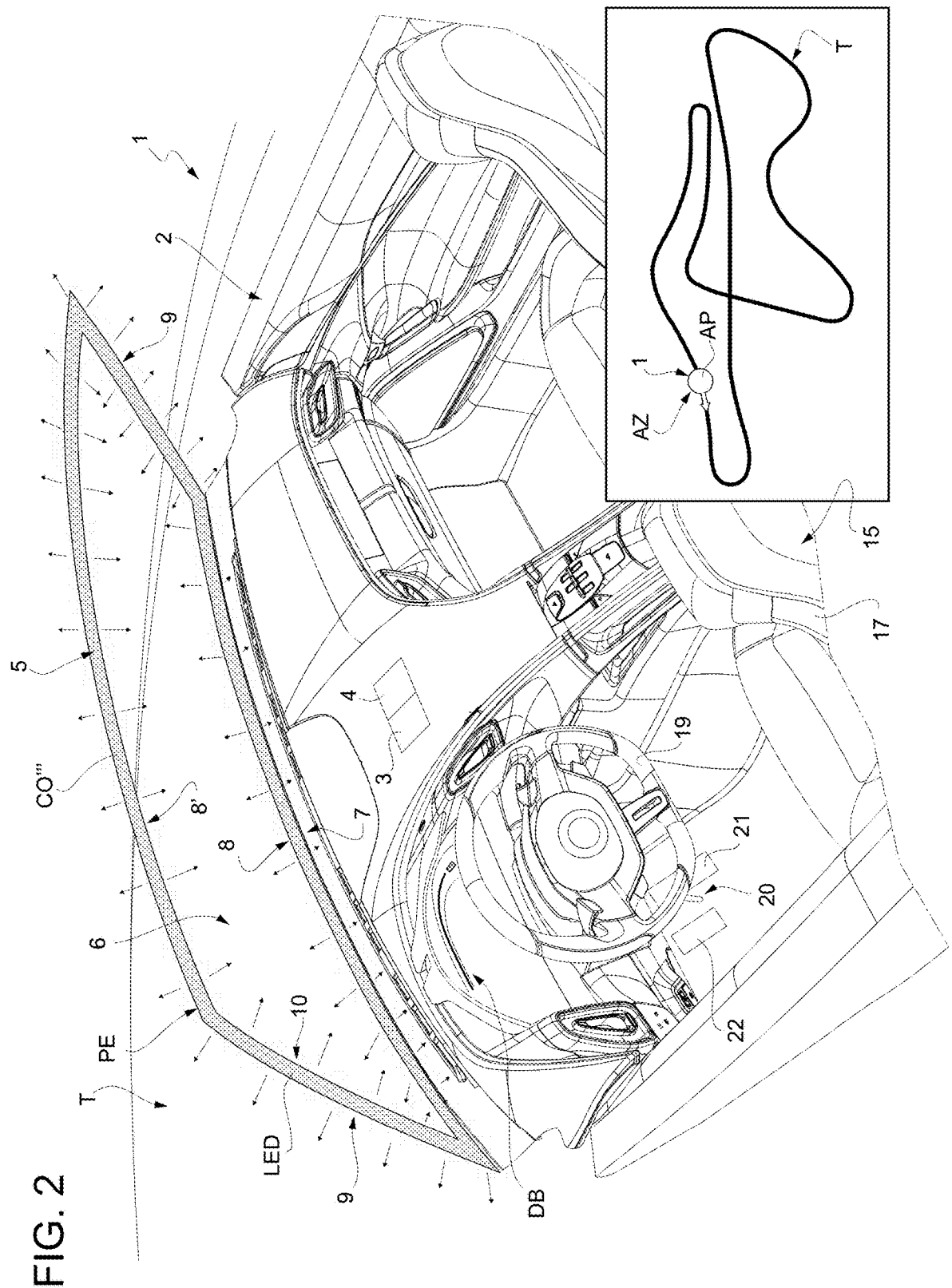
FIGS. 2 to 6 form a schematic perspective sequence, with details left out for greater clarity, of the portion of the road vehicle of FIG. 1 in different operating configurations of a first embodiment.
Figure 3:
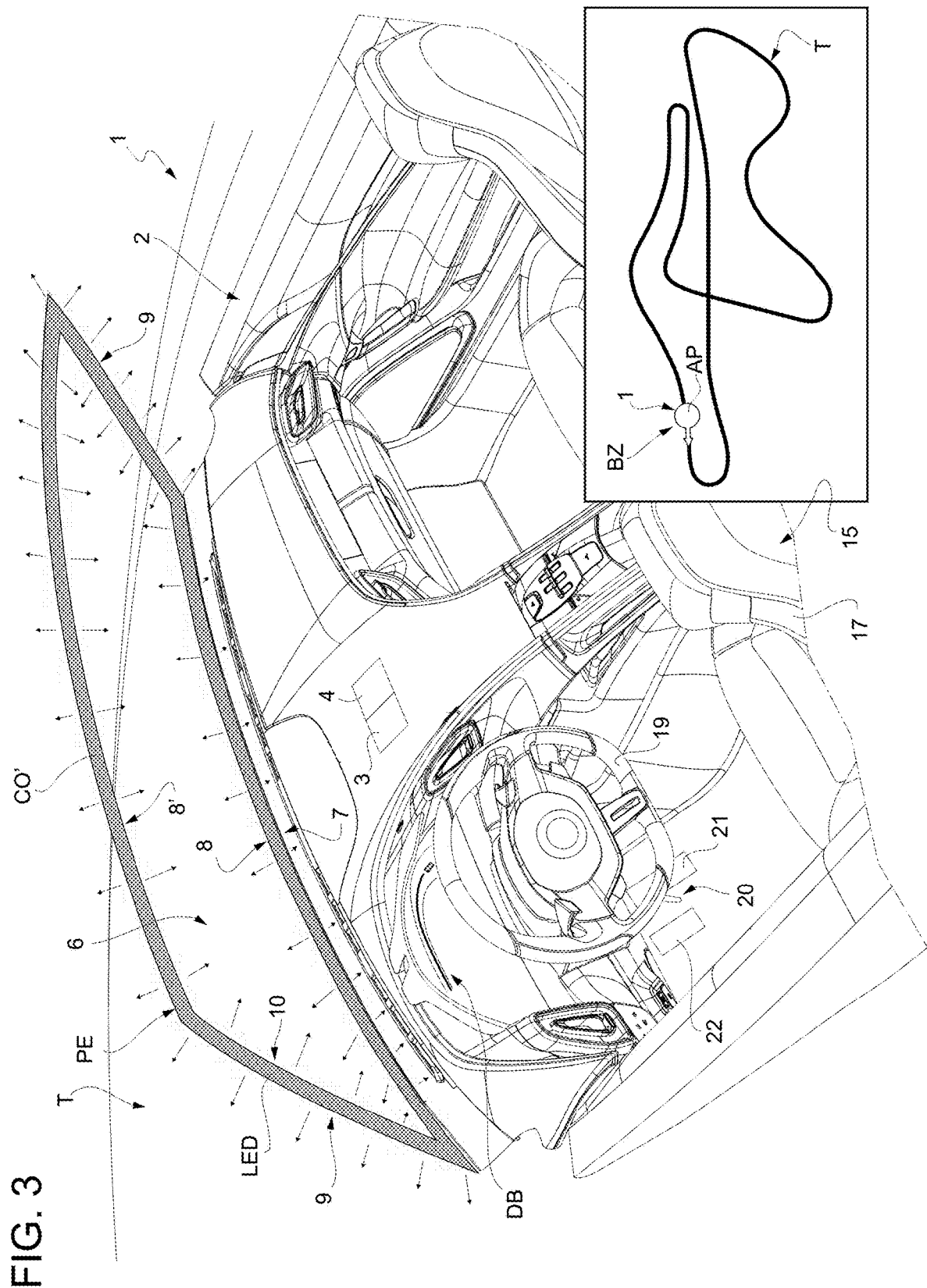
Figure 6:
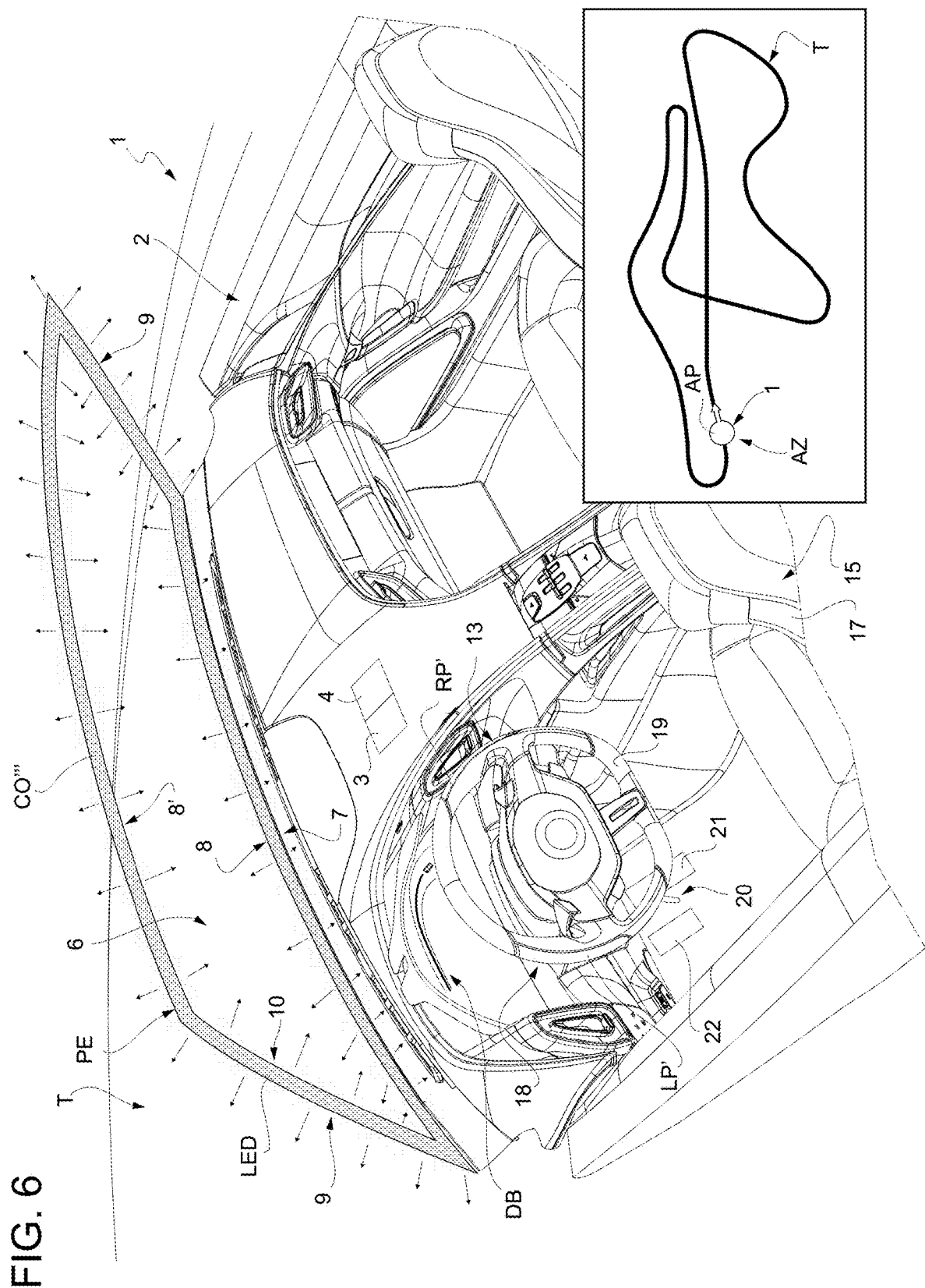

Alternatively or in addition, the interface device 5 is configured to light up with a third colour CO'" (preferably, green) in a maximum acceleration zone AZ (FIGS. 2 and 6), in particular following the zone PZ of optimal partialisation and/or preceding the optimal braking zone BZ. Preferably, though not necessarily, the interface device 5 preserves the third colour CO'" for the entire length of the maximum acceleration zone AZ, namely the entire time the driver has to press the accelerator pedal 21 all the way down.

In some non-limiting cases, the interface device shifts from one colour CO', CO", CO'" to the other in a sudden manner. In other non limiting cases, the interface device shifts from one colour CO', CO", CO'" to the other through shades.

According to some non-limiting embodiments, the interface device 5 is configured to blink in order to make the suggestions more evident for the driver.

Figure 8A:
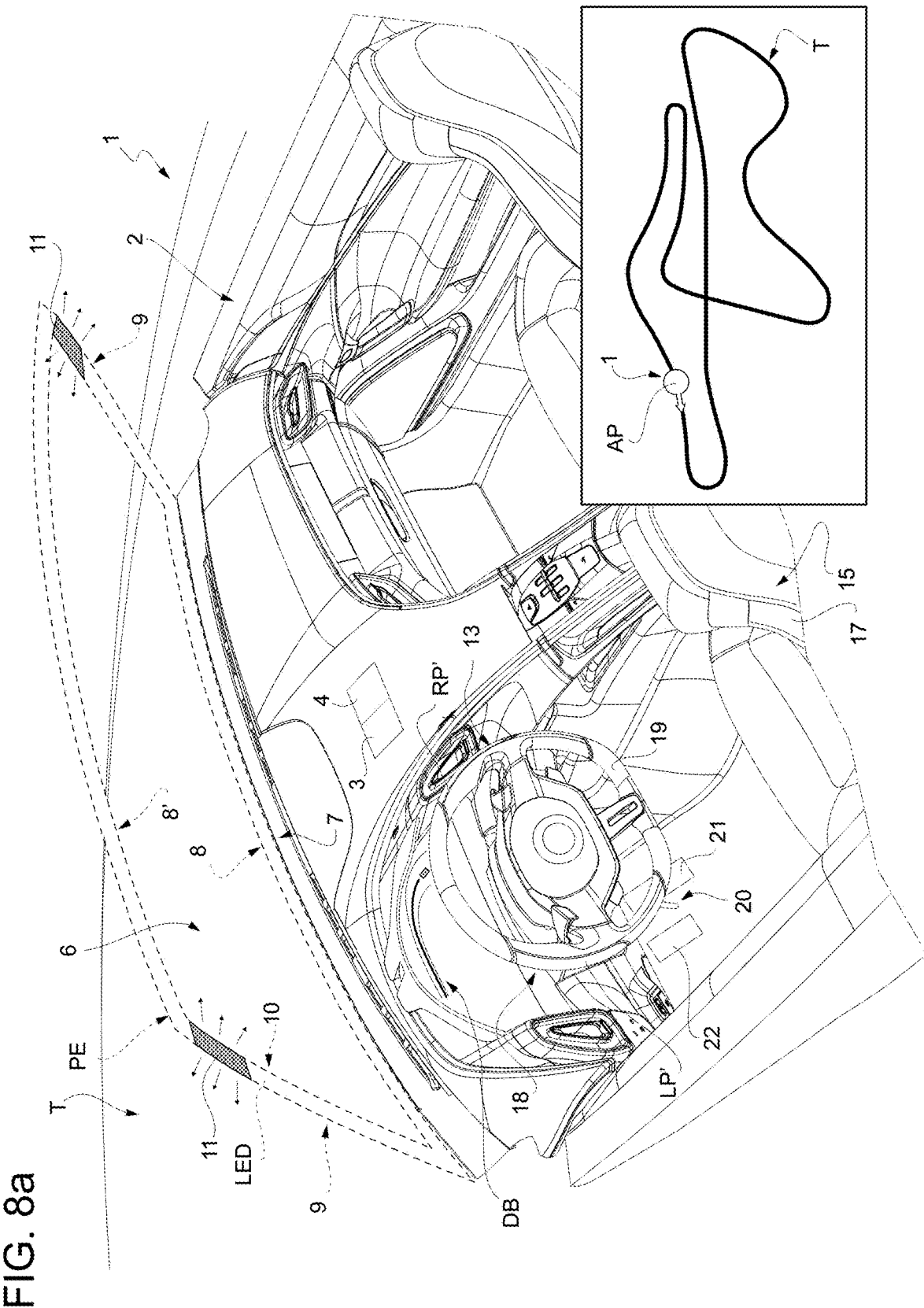
FIGS. 8a-8e form a schematic perspective sequence, with details left out for greater clarity, of the portion of the road vehicle of FIG. 1 in different operating configurations of a third embodiment.
Figure 8B:
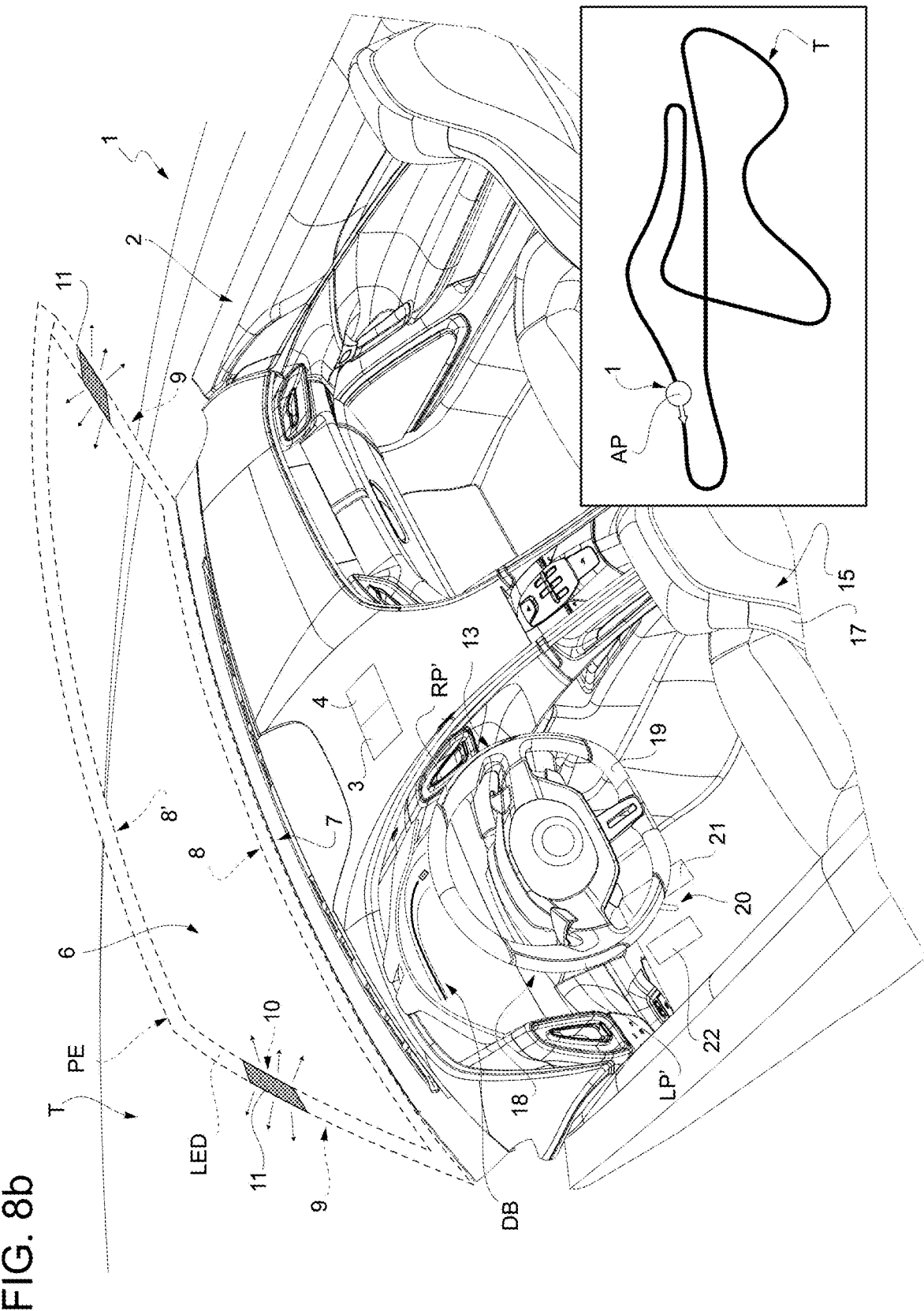
Figure 8C:
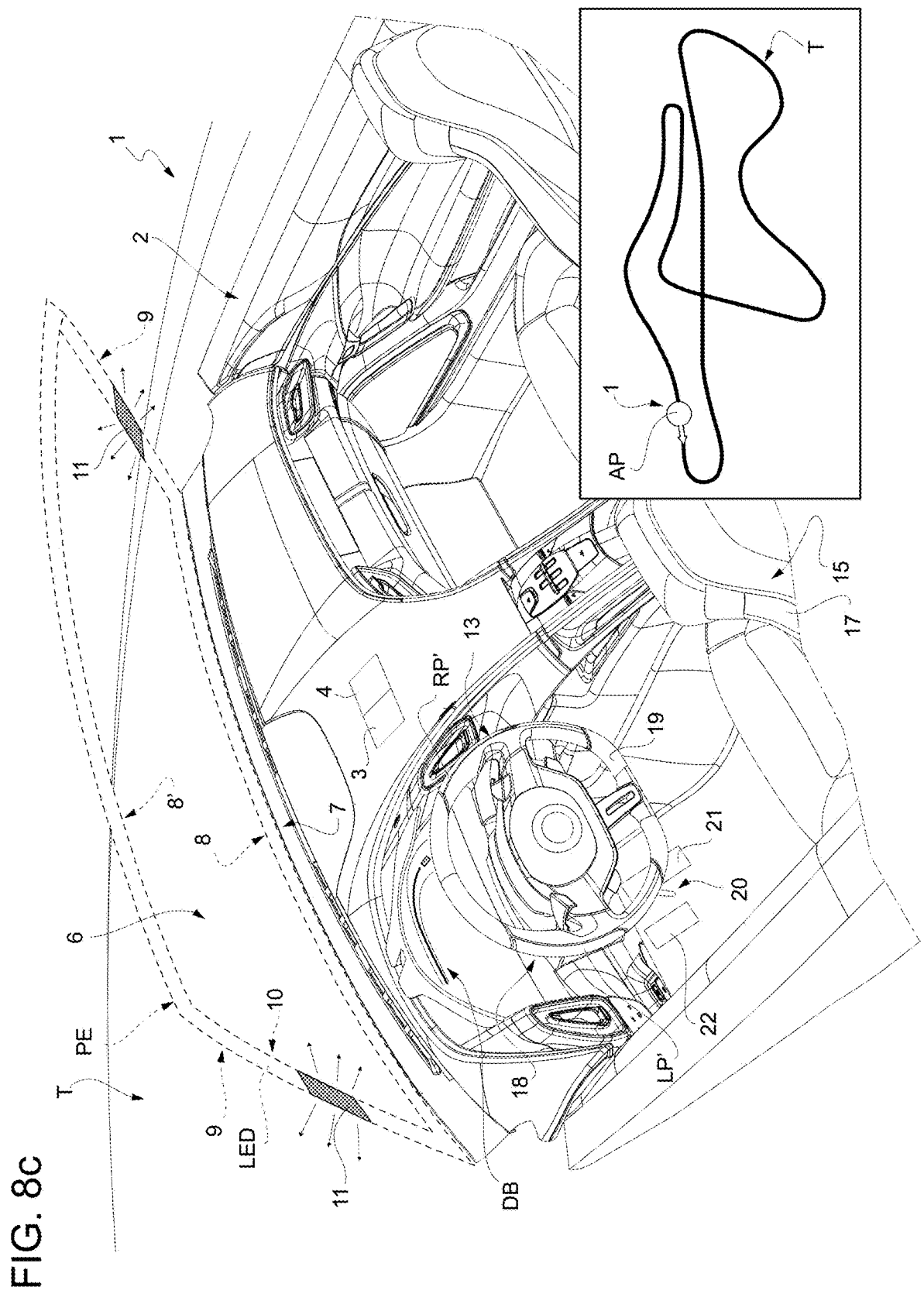
Figure 8D:
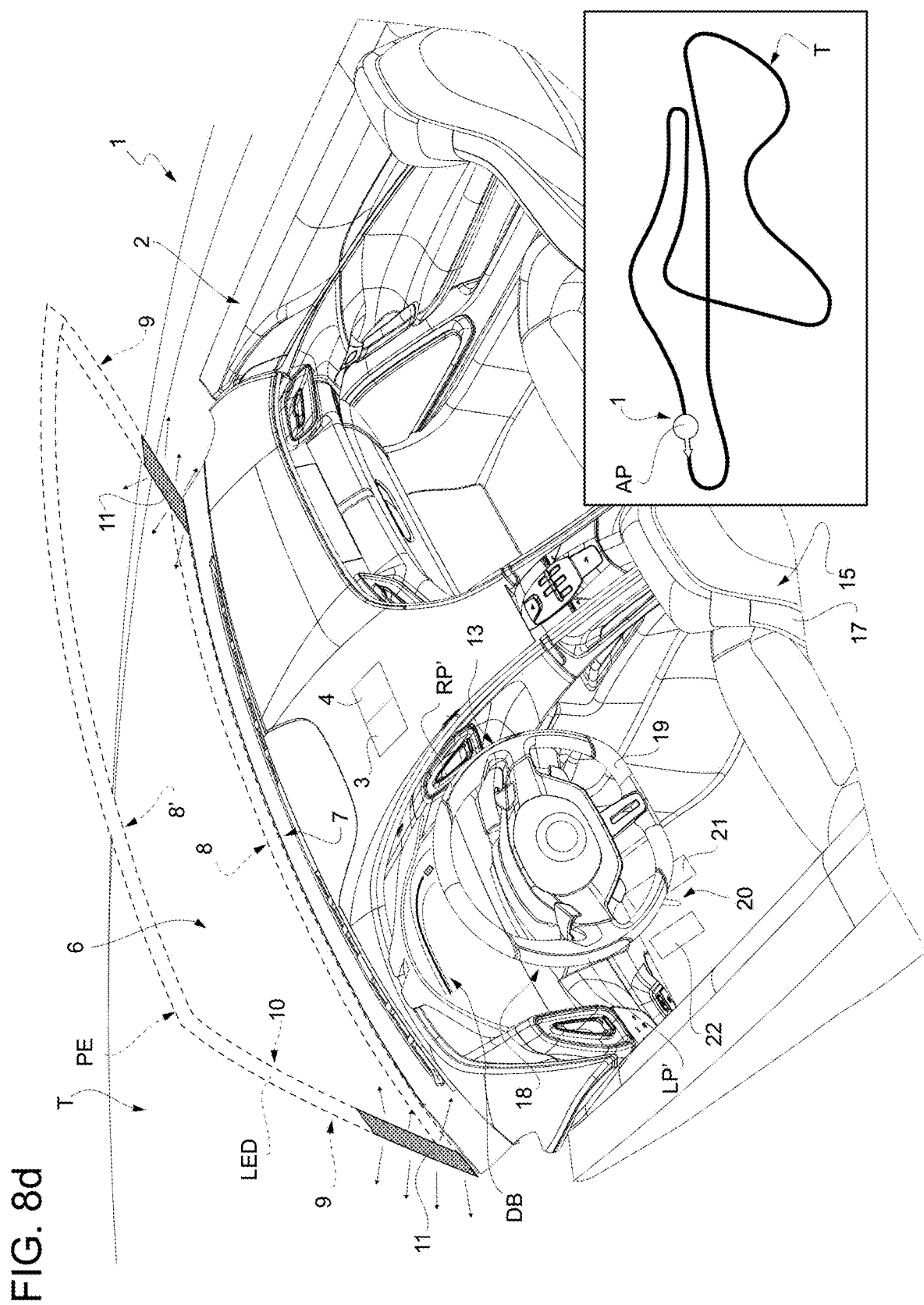
Figure 8E:
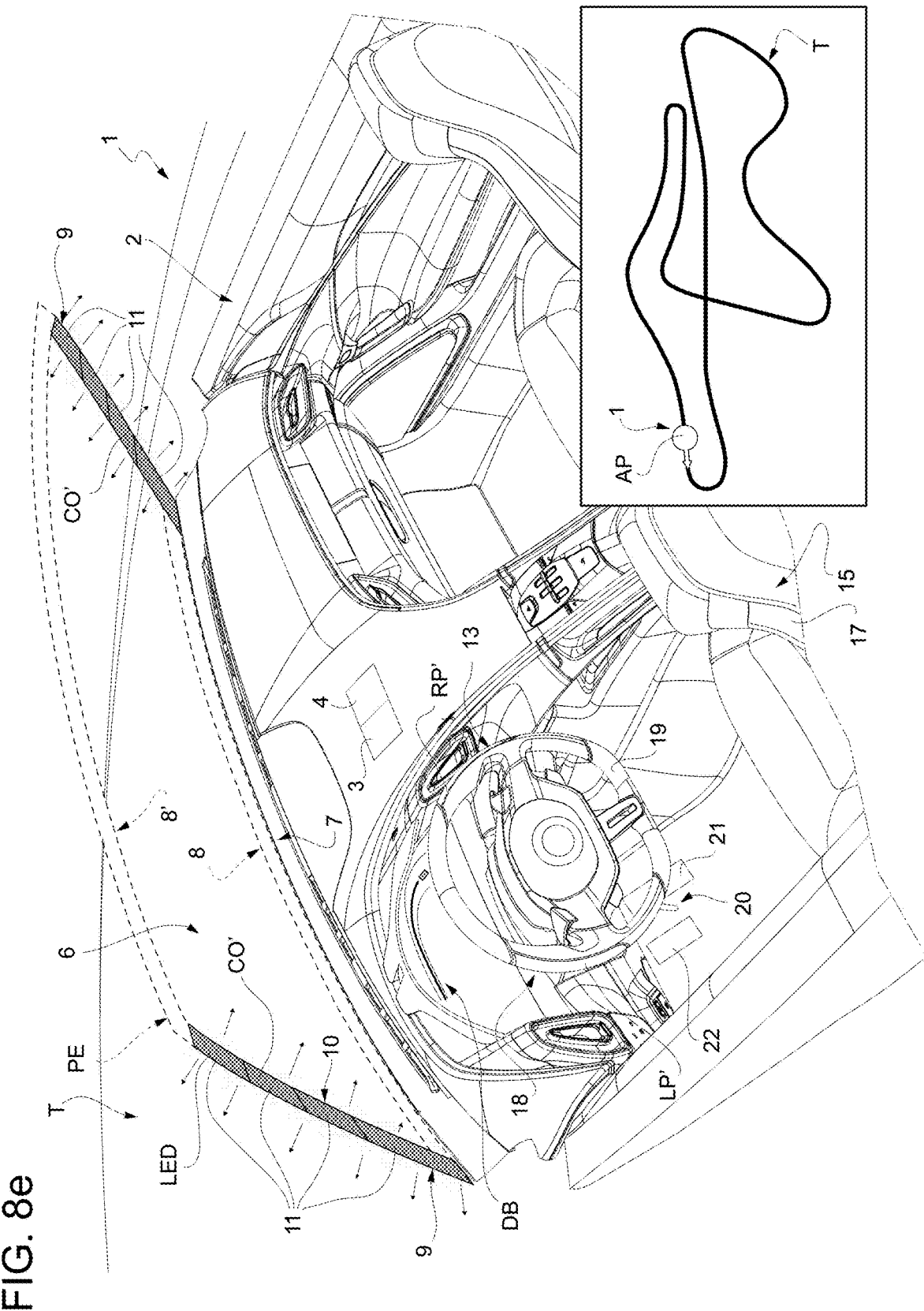

Advantageously, though not necessarily, according to the non-limiting embodiments of FIGS. 1 and 8e, the light interface device 5 has an elongated shape and is arranged in the area of the perimeter PE of the windscreen 6 of the road vehicle 1.

In some non-limiting cases, the light interface device 5 with an elongated shape is arranged in the area of the curvature 7 of the road vehicle 1, namely in the area of the lower side 8 of the windscreen 6.

Alternatively or in addition, the light interface device 5 with an elongated shape is arranged in the area of the front pillars 9 (also known as A pillars) of the road vehicle 1, namely along the right and left sides 10 of the windscreen.

Alternatively or in addition, the light interface device 5 with an elongated shape is arranged in the area of the upper side 8' of the windscreen 6.

According to some non-limiting embodiments, like the one shown in FIG. 1, the light interface device 5 with an elongated shape is at least partially arranged on all sides 8, 8', 11 of the windscreen 6; in particular, so as to entirely surround the windscreen 6.

In the non-limiting embodiment of FIGS. 8a-8e, the light interface device 5 is at least partially divided into adjacent sections 11, in particular in the area of the right and left sides 10 (namely along the A pillars 9) of the windscreen 6, which are configured to light up with the first colour CO' in a progressive manner (namely, as the following sections 11 light up, the previous sections 11 remain on) or in sequence (namely, as the following adjacent section 11 lights up, the previous one is turned off) as the optimal braking zone BR gets closer, in particular approaching the curve C. In other words, the adjacent sections 11 indicate to the driver the distance up to the next braking zone BR, so as to warn him/her without surprises about when braking is needed. For example, each section 11 can indicate a space range (fifty or one hundred metres) or a time range (one second) to warn the driver and allow him/her to understand, in advance, how far the braking zone BR is.

Advantageously, though not necessarily, the light interface device 5 comprises (is) at least one LED strip.

Advantageously, though not necessarily and according to the non-limiting embodiment of FIG. 7, alternatively or in addition to what disclosed above, the light interface device 5 is configured to at least partially colour itself with a fourth colour (which can even be the same as the third colour CO''') upon reaching of an apex point AX. For example, in the non-limiting embodiment of FIG. 7, the interface device 5 comprises two further sections 12, which are arranged in the area of the curvature 7, on the sides, towards the pillars 9, and are configured to light up/colour themselves in case the driver correctly enters the curve C and reaches the apex point AX, so as to allow him/her to understand which behaviour to repeat during the next lap. According to some non-limiting embodiments, like the one shown in FIG. 9, the light interface device 5 is arranged between the eyes of the driver and the windscreen 6 of the road vehicle 1. In particular, the light interface device 5 comprises (is) a head-up display (HUD), which is configured to mainly (in particular, totally) colour itself with the first CO', the second CO'' or the third colour CO''' based on what disclosed above (namely, based on the zone BZ, PZ, AZ through which the road vehicle 1 drives).

Figure 4:
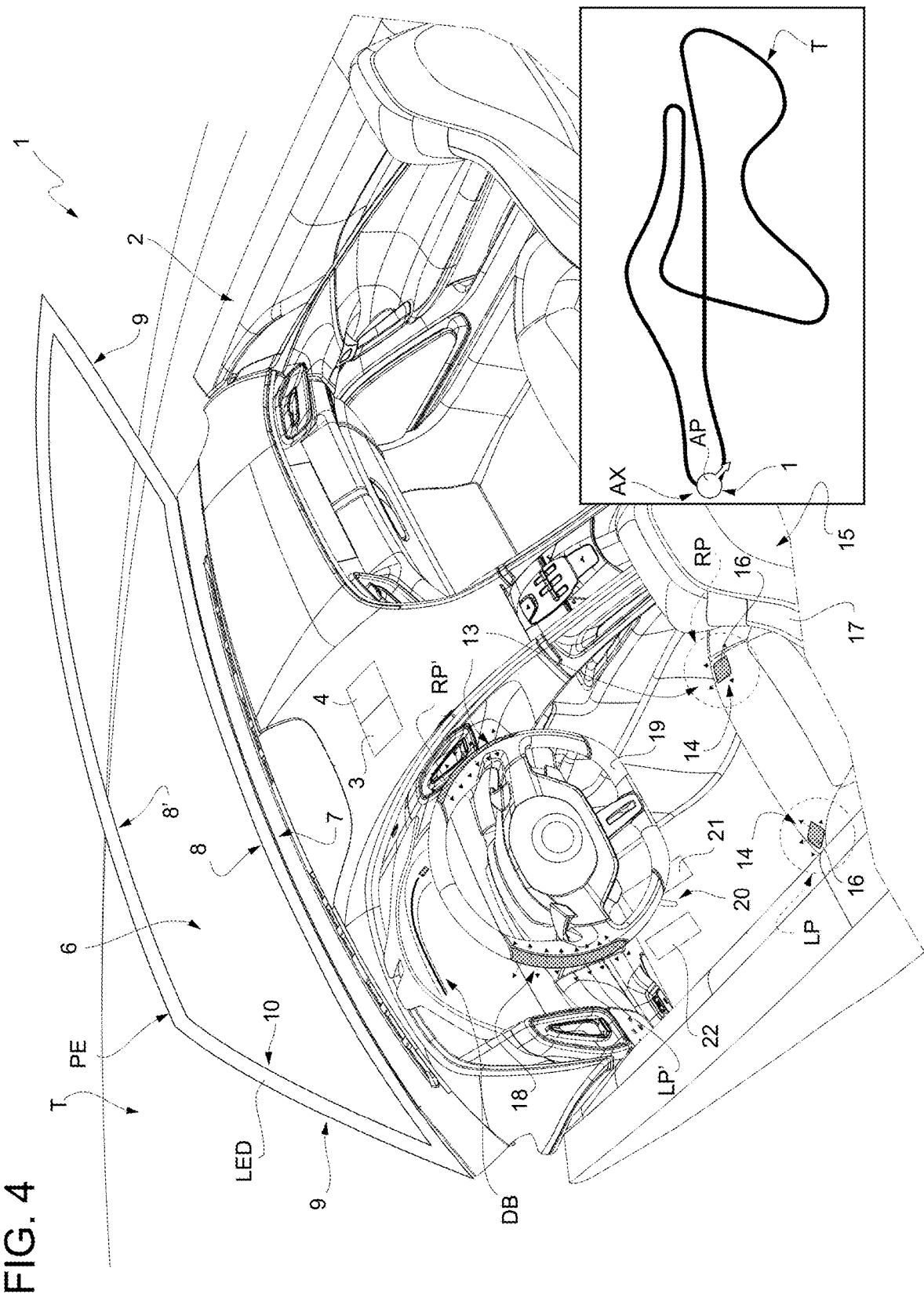

Advantageously, though not necessarily, for example as shown in the non-limiting embodiment of FIG. 4, the control unit 4 is configured to determine, in use, a lateral deviation of the road vehicle 1 from the optimal trajectory OT and/or an understeer/oversteer condition in a curve C.

In particular, the road vehicle 1 preferably comprises a haptic interface device 13 arranged so that it can be perceived by the driver and does not obstruct the driver's view of the track T. In detail, the haptic interface device 13 is configured to suggest to the driver one or more actions to be performed to vary a lateral dynamic of the road vehicle 1 in order to perform a mission that optimises track performance T.

Advantageously, though not necessarily, the haptic interface device 13 is configured to be perceived by the driver as a function of the lateral deviation and/or understeer/oversteer condition in curve C of the road vehicle.

Advantageously, though not necessarily, the haptic interface device 13 is configured to be activated by the control unit 4 exclusively while driving along a curve C. In this way, it is possible to avoid undesired vibrations or, anyway, those vibrations that are not useful for the purpose of performances, like the ones caused by deviations on a straight road. In particular, the haptic interface device 13 is configured to be activated during the braking zone BZ and the partialisation zone PZ. More in particular, the haptic interface device 13 is configured to be activated from one hundred metres before the apex point AX of the curve C to one hundred metres after the apex point AX.

In the non-limiting embodiments of FIGS. 1 and 4, the haptic interface device 13 comprises a vibrating device 14, in particular arranged in the area of a seat 15 of the road vehicle 1 configured to accommodate the driver. In particular, the vibrating device 14 is configured to vibrate asymmetrically so that the driver perceives a right or left vibration so as to suggest to the driver that a first threshold value is exceeded by the lateral deviation from the optimal trajectory OT. In other words, the vibrating device 14 activates itself only in case the vehicle deflects from the optimal trajectory OT for a distance exceeding the first threshold value (for example, two metres).

Advantageously, though not necessarily, the vibrating device 14 comprises at least two different vibrating elements 16 arranged in a right portion RP and a left portion LP of the seat 15, respectively; in particular in an outer distal area of a seat cushion and/or in an outer lateral area of a backrest 17 of the seat 15. In particular, the vibrating device 14 is configured to be controlled in terms of intensity, changing the vibration as a function of the lateral deviation (the greater the lateral deviation, the greater the vibration).

Figure 9:
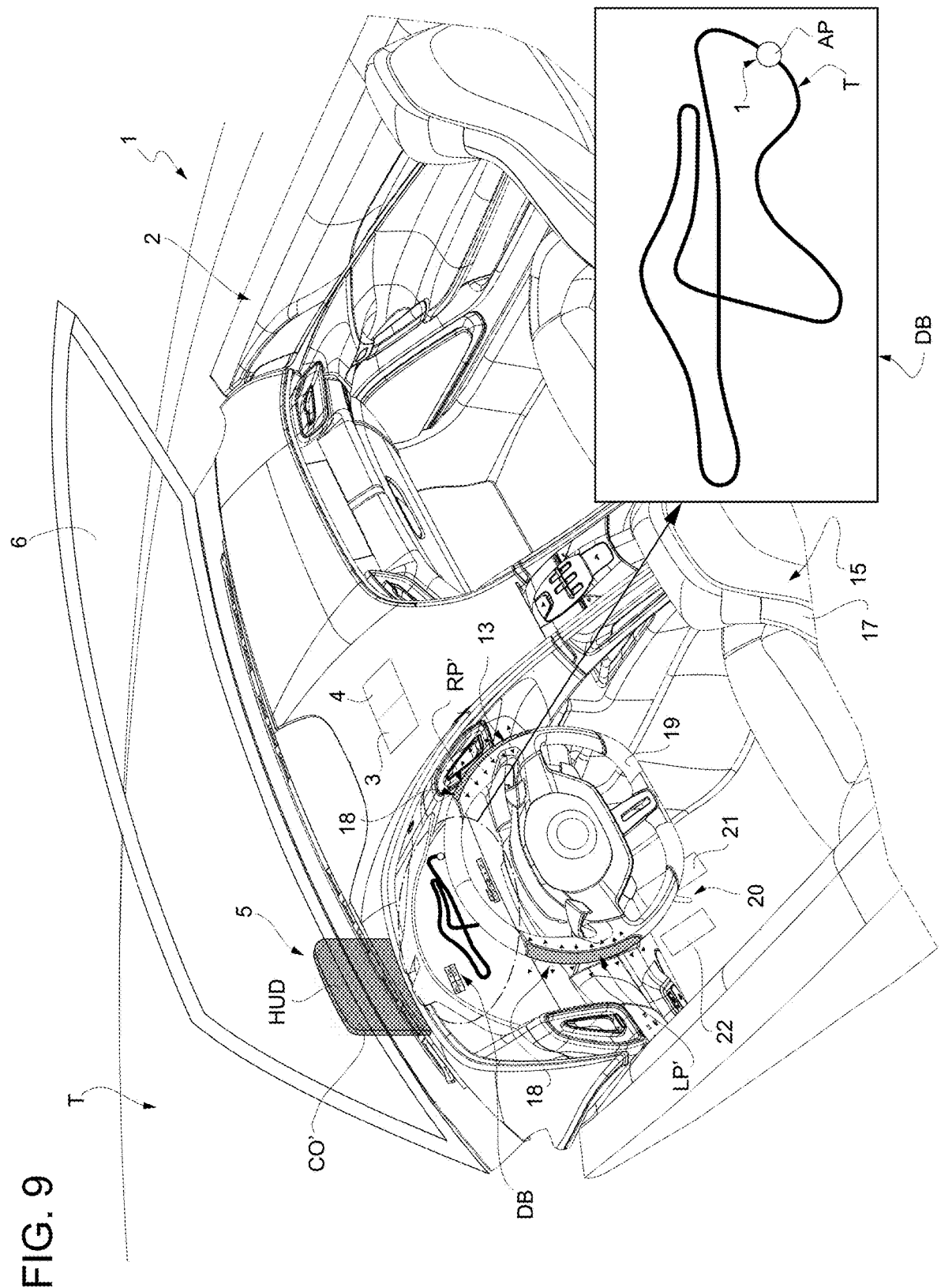
FIG. 9 is a schematic perspective view, with details left out for greater clarity, of the view from the inside of a passenger compartment in a fourth embodiment.

Preferably, as shown in the non-limiting embodiments of FIGS. 1, 4 and 9, the haptic interface device 14 comprises a vibrating device 18 arranged in the area of or comprising at least part of the steering wheel 19 of the road vehicle 1. In particular, the vibrating device 18 is configured to vibrate while driving along a curve C so as to warn the driver of an understeer condition exceeding a second threshold value, hence suggesting a reduction in the steering angle 19. In other words, the control unit 4 is configured to operate the vibrating device 18 comprising at least part of the steering wheel 19 when understeer/oversteer conditions exceeding a given threshold value occur and/or when the steering angle set by the driver exceeds a given threshold value (for example, ten degrees at a given respective speed) of the ideal steering angle that would maintain the optimal trajectory OT, so as to warn the driver, who can immediately correct the steering angle, thus avoiding a possible 180° spin or, anyway, a wrong exit from the curve C. In particular, the vibrating device 18 is configured to be controlled in terms of intensity, changing the vibration as a function of the lateral deviation (the greater the deviation of the ideal steering angle, the greater the vibration).

In some non-limiting cases, the vibrating device 18 is configured to cause the entire steering wheel 19 of the road vehicle 1 to vibrate, in particular by means of an electric actuation of the steering wheel already present on board the road vehicle 1.

In other non-limiting cases, the vibrating device 18 is configured to selectively cause a right portion RP' or a left portion RL' of the steering wheel 19 of the road vehicle 1 to vibrate in order to indicate to the driver the direction to or from which to correct the steering angle.

According to a non-limiting embodiment, the haptic interface device 13 comprises a resistive device 20 installed in the area of an accelerator pedal 21 of the road vehicle 1.

In particular, the resistive device 20 is configured to at least partially stiffen or cause a vibration of the accelerator pedal 21 (under the control of the control unit 4), when exiting a curve C, thus warning the driver of an oversteer condition exceeding a third threshold value, thereby suggesting a reduction in the pressing of the accelerator pedal 21.

Preferably, though not necessarily, as in the non-limiting embodiment of FIGS. 1 and 9, the vehicle 1 comprises both the light interface device 5 and the haptic interface device 13.

In particular, in the non-limiting embodiment of FIG. 9, the vehicle 1 comprises the head-up display HUD and the vibrating device 18 on the steering wheel. In particular, the vibrating device 18 is obtained by means of an electric actuation already present on board the vehicle 1. By so doing, no components have to the added to the road vehicle 1.

Advantageously, though not necessarily, the vehicle 1 further comprises an audio system (which is known and, therefore, is not described in detail) configured to emit a sound signal (for example, a recorded voice) to suggest to the driver in which gear to enter the next curve C.

In other embodiments, the head-up display HUD is configured to (visually) suggest to the driver the best gear to face the next curve C.

Alternatively or in addition, the audio system is advantageously configured to emit a second sound signal (for example, a bip) to suggest to the driver the point of the track T or the vehicle conditions in which to upshift (in order to optimize the management of the torque during the gear shift).

According to a further aspect of the invention, there is provided a method for the performance-enhancing driver assistance of a road vehicle 1 on a track T.

In particular, the method comprises the step of (at least partially) determining the conformation of the track T on which the road vehicle 1 is located. More precisely, the method entails determining at least the conformation of the track T for the next 100 m from the road vehicle 1.

The method further comprises the steps of determining, in use, the current position AP and the current orientation of the road vehicle 1 on the track T by means of the tracking device 3; and of identifying the optimal trajectory OT in relation to the conformation of the track T and/or to the road vehicle 1.

Advantageously, though not necessarily, the method entails determining, in use, the relative position of the road vehicle with respect to the optimal trajectory by identifying the longitudinal relative position (namely, where the vehicle 1 is linearly located) on the optimal trajectory OT.

In particular, the method further comprises the step of suggesting to the driver, by means of one or more colours emitted or assumed by the light interface device 5, depending on the longitudinal relative position, one or more actions to be performed to vary a longitudinal dynamic of the road vehicle 1 in order to perform a mission optimising the performance on the track T (namely, minimizing lap times).

Preferably, the method further entails suggesting to the driver, by means of the first colour CO' of the light interface device 5, depending on the longitudinal relative position (namely, on the current position AP), an optimal braking zone BZ, in particular approaching a curve C.

As shown in the non-limiting embodiment of FIGS. 8a-8e, the light interface device 5 is controlled (by the control unit 4) so as to indicate, by means of a progression (or a sequence) of the first colour CO', the approaching of the optimal braking zone BZ.

In some preferred non-limiting embodiments, the method entails suggesting to the driver, by means of the second colour CO", which is different from the first colour CO' of the light interface device 5, depending on the longitudinal relative position (namely, on the current position AP), an optimal partialisation area, in particular when exiting a curve C.

Alternatively or in addition, the method entails suggesting to the driver, by means of the third colour CO''', which is different from the first colour CO' and/or the second colour CO" of the light interface device 5, depending on the longitudinal relative position (namely, on the current position AP), a maximum acceleration zone AZ, particular following the zone PZ of optimal partialisation and/or preceding the optimal braking zone BZ.

Advantageously, though not necessarily, at least a portion of the light interface device 5 (in particular, the sections 12) is controlled to colourfully indicate to the driver that the apex point AX has been reached while driving along a curve C.

Figure 10:
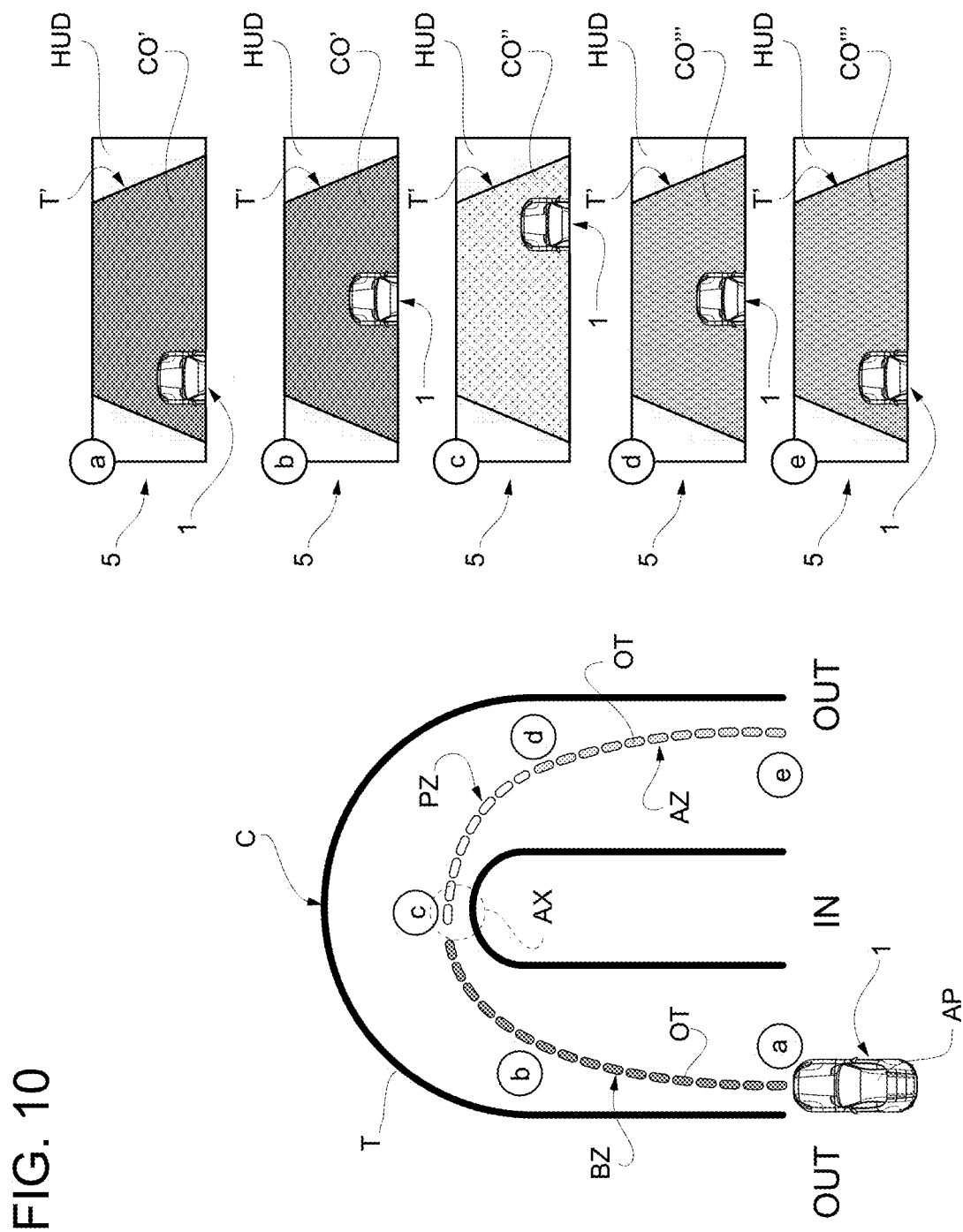
FIG. 10 schematically shows a possible sequence of items of information provided by the vehicle of FIG. 9.

In the non-limiting embodiment of FIGS. 9 and 10, the method entails controlling the light interface device 5 so as to suggest to the driver the position that the vehicle 1 should take transversely to the track T.

Advantageously, though not necessarily, the method entails communicating to the driver the current position AP on the track T, so that he/she knows which sectors of the track he/she is going to have to face and can adjust the dynamic of the vehicle 1 accordingly.

In particular, FIG. 10 shows different possible configurations of the head-up display HUD depending on the zone BZ, PZ, AZ in which the road vehicle 1 is located (for example, along a curve). In particular, the vehicle 1, while covering the optimal trajectory OT, goes through five different situations a-e, in three different zones BZ, PZ, AZ, going from the outside OUT of the curve to the inside IN thereof (through the apex point AX) and vice versa when exiting the curve C. More precisely, in situation a, the interface device 5 (HUD) colours itself with the first colour CO' indicating to the driver that the vehicle is in the braking zone BZ and, therefore, braking is necessary. In situation b, which is subsequent to situation a, the interface device 5 (HUB) maintains the first colour CO', but horizontally moves the schematic vehicle 1 towards the inside IN of the curve, suggesting to the driver the horizontal position in which the vehicle 1 should be (between one roadway and the other), if it followed the optimal trajectory OT; hence, suggesting to the driver to keep braking, at the same time moving the steering wheel 19. In situation c, the interface device 5 (HUD) colours itself with the second colour CO" indicating to the driver that the vehicle now is in the partialisation zone PZ and, therefore, a moderate acceleration is allowed. In situation d, the interface device 5 (HUD) colours itself with the third colour CO''' indicating to the driver that the vehicle now is in the acceleration zone AZ and, therefore, a maximum acceleration is needed, keeping following the indications of the head-up display as reference for the suggested position on the track T. In situation e, the interface device 5 (HUD) maintains the third colour CO''', but it continues horizontally moving the schematic vehicle 1 towards the outside OUT of the curve, suggesting to the driver the horizontal position in which the vehicle 1 should be (between one roadway and the other), if it followed the optimal trajectory OT; hence, suggesting to the driver to keep up with the maximum acceleration, at the same time moving the steering wheel 19 until a configuration is reached, in which the wheels of the vehicle are straight.

Advantageously, though not necessarily, the method further comprises the step of determining, in use, a lateral deviation of the road vehicle 1 from the optimal trajectory OT and/or an understeer/oversteer condition in curve C.

In particular, the method comprises the step of suggesting to the driver, by means of the haptic interface device 13, depending on the lateral deviation and/or on the understeer/oversteer condition in curve, one or more actions to be performed in order to vary a lateral dynamic of the road vehicle 1 in order to perform a mission which optimises the performance on the track T.

In the non-limiting embodiment of FIGS. 1, 4 and 7, the vibrating device 14 is controlled so as to asymmetrically vibrate, so that the driver perceives a right or left vibration.

The method preferably entails controlling the vibrating device 14 so as to suggest to the driver that a first threshold value for the lateral deviation from the optimal trajectory OT (namely, a maximum extent of deviation allowed to the right and to the left of the optimal trajectory OT) has been exceeded.

In some non-limiting cases, if the lateral deviation exceeds the first threshold value to the right or to the left of the vehicle 1, the vibrating device 14 is controlled so as to vibrate concordantly so that the driver perceives a right or left vibration, respectively.

In other non-limiting cases, if the lateral deviation exceeds the threshold value to the right or to the left of the vehicle 1, the vibrating device 14 is controlled so as to vibrate contralaterally so that the driver perceives a left or right vibration, respectively.

According to the non-limiting embodiments of FIGS. 1, 4, 7, and 9, the vibrating device 18 is configured to vibrate while driving along a curve C so as to warn the driver of an understeer condition exceeding the second threshold value, hence suggesting a reduction in the steering angle.

In some non-limiting cases, the vibrating device 18 is controlled so as to cause the entire steering wheel 19 of the road vehicle to vibrate. In other non-limiting cases, the vibrating device 18 is controlled so as to selectively cause the right portion RP' or the left portion RL' of the steering wheel 19 of the road vehicle 1 to vibrate in order to indicate to the driver the direction to or from which to correct the steering angle.

In some non-limiting cases, the vibrating devices 14 and 18 are controlled so as to vibrate at different intensities, respectively, depending on the deviation from the respective first and second threshold values discussed above.

According to some non-limiting embodiments, the resistive device 20 is controlled by the control unit 4 so as to at least partially stiffen, when exiting a curve, the accelerator pedal 21 in order to warn the driver of an oversteer condition exceeding a third threshold value, hence suggesting a reduction in the pressing of the accelerator pedal 21, thereby avoiding a 180° spin.

The first colour CO', the second colour CO", the third colour CO'" and the fourth colour can be set by the driver through a selection system, for example selecting suitable preferences on the dashboard DB. In this way, colour-blind people can select different colours for the light interface device 5, other than red and green, increasing (for example, using blue) contrast and the extent to which the suggestion can be perceived by the driver.

Advantageously, though not necessarily, the light interface device 5 and/or the haptic interface device 13 can selectively be activated/deactivated by the driver (even along some mere segments of the track T).

Advantageously, though not necessarily, the suggestions delivered to the driver are adjusted in terms of quality and quantity depending on the driving abilities of the driver (estimated with known method, which are not described in detail herein). In particular, the amount of information is adjusted according to a bell-shaped diagram, in which a completely inexperienced driver and a very experienced driver receive a few items of information (preferably different from one another), whereas an intermediate-level driver, who is more likely to improve and understand, receives a larger amount of information.

Advantageously, though not necessarily, the haptic interface device 13 is activated only while driving along a curve C.

Advantageously, though not necessarily, the method comprises the further step of projecting a virtual reproduction of the optimal trajectory OT onto the dashboard DB (FIGS. 1 and 7). In this way, the driver can control, for example when driving along a straight stretch of road, which type of curve the vehicle will have to face in the near future. In particular, the method entails indicating the current position AP of the vehicle 1 on the virtual reproduction of the track, so that the driver can change the current position AP of the vehicle 1 depending on the relative position thereof with respect to the optimal trajectory OT.

According to some non-limiting embodiments, which are not shown herein, the method entails controlling the light interface device 5 so that it colours itself in the area of the left pillar 9 or of the right pillar 9 in order to suggest to the driver that the lateral deviation from the optimal trajectory OT has exceeded a threshold value.

In some non-limiting cases, if the lateral deviation exceeds the first threshold value to the right or to the left of the vehicle 1, the light interface device 5 is controlled so as to light up the pillar 9 accordingly so that the driver perceives a right or left light, respectively.

In other non-limiting cases, if the lateral deviation exceeds the first threshold value to the right or to the left of the vehicle 1, the light interface device 5 is controlled so as to light up the pillar 9 accordingly so that the driver perceives a left or right light, respectively.

According to some non-limiting embodiments, which are not shown herein, the vibrating device 14 (in detail, the vibrating elements 16) is used to indicate to the driver that an apex point AX was reached. In particular, while driving along a curve to the right or to the left, the reaching of the apex point by the river is signalled with the vibration of the right or left vibrating element, respectively.

Advantageously, though not necessarily, the vehicle 1 described above is configured to carry out the method disclosed so far and vice versa.

Even though the invention described above relates to a specific embodiment example, it should not be considered as limited to said embodiment example, for its scope of protection also includes all those variants, changes or simplifications covered by the appended claims, such as, for instance, a different type of interface, a different performance optimisation method, a different type of vehicle (for example, a two-wheel vehicle or a front-drive vehicle), different colours or vibrating devices, etc.

The invention offers many advantages.

First of all, it enhances the performances of a driver driving a road vehicle by suggesting to the driver actions to be performed that are calculated not only based on the current dynamic of the vehicle, but also based on the future path to be covered by the vehicle. In this way, the driver can receive suggestions on when to accelerate, decelerate, shift gear and on which trajectory to follow based on what the vehicle perceives.

Furthermore, the invention actively helps the driver reach performances of a good level through the aid of the light and haptic interface devices, so that he/she does not excessively strays away from the optimal trajectory and from a good performance.

A further advantage of the invention lies in the possibility of coaching the driver, showing—on the field and without cognitive overload (which is what happens with a coach)—how certain difficult parts of the path have to be dealt with, avoiding continuously creating external references for the driving actions to be carried out.

Furthermore, the invention increases the safety of the vehicle, as the driver can actively perceive the suggestions delivered by the light and haptic interface system without ever looking away or removing the focus from the road, especially when driving along a curve.

In addition, thanks to the possibility of transmitting suggestions by means of an intuitive interface, which does not require special abilities or attentions, the learning of the driver and the improvement of his/her driving ability are facilitated.

LIST OF THE REFERENCE NUMBERS OF THE FIGURES 1 road vehicle
2 passenger compartment
3 tracking device
4 control unit
5 light interface device
6 windscreen
7 curvature
8 lower side
8' upper side
9 pillars
10 right and left sides
11 sections
12 sections
13 haptic interface device
14 vibrating device
15 seat
16 vibrating elements
17 backrest
18 vibrating device
19 steering wheel
20 resistive device
21 accelerator pedal
22 brake pedal
AP current position
AX apex point
AZ maximum acceleration zone
BZ braking zone
C curve
CO' first colour—red
CO" second colour—yellow
CO''' third colour—green
DB dashboard
HUD head-up display
LED LED strip
LP left portion
LP' left portion
OT optimal trajectory
PE windscreen perimeter
PZ partialisation zone
RP right portion
RP' right portion
T track

The invention claimed is:

1. A method for a performance-enhancing driver assistance of a road vehicle (1) on a track (T);
the method comprising:
   determining, at least partially, a conformation of the track (T) on which the road vehicle (1) is located;
   determining, in use, the position (AP) and the current orientation of the road vehicle (1) on the track (T) by means of a tracking device (3);
   identifying an optimal trajectory in relation to the conformation of the track (T) and/or the road vehicle (1);
   determining, in use, a relative position (AP) of the road vehicle (1) with respect to the optimal trajectory by identifying a longitudinal relative position (AP) on the optimal trajectory;
   suggesting to a driver, by enabling a light interface device positioned along a periphery of a windshield with one or more colours emitted or assumed by the light interface device (5), depending on the longitudinal relative (AP) position, one or more actions to be performed to vary a longitudinal dynamic of the road vehicle (1) in order to perform a mission optimising a performance on the track (T);
   wherein the one or more colours emitted or assumed by the light interface device (5) comprises:
   a first colour (CO') corresponding to an optimal braking zone (BZ), in particular when approaching a curve (C), is suggested to the driver, depending on the longitudinal relative position (AP);
   by a second colour (CO''') different from the first colour (CO') of the light interface device (5) corresponding to an optimal partialisation zone (PZ), depending on the relative longitudinal position (AP), wherein the driver adjusts with moderation, acceleration pressing of an accelerator pedal; and
   a third colour (CO''') different from the first colour (CO') and/or the second colour (CO''') of the light interface device (S5) corresponding to a maximum acceleration zone (AZ), following the optimal partialisation zone (PZ) and/or preceding the optimal braking zone (BZ) depending on the relative longitudinal position (AP).

2. Method according to claim 1, wherein the optimal braking zone (BZ) is suggested when approaching a curve (C).

3. The method according to claim 1, wherein the light interface device (5) is controlled to indicate by a progression of the first colour (CO') the approach to the optimal braking zone (BZ).

4. The method according to claim 1, wherein the optimal partialisation zone (PZ) is suggested when exiting a curve (C).

5. The method according to claim 1, wherein at least a portion of the light interface device (5) is controlled to colourfully indicate to the driver that #ke-an apex point (AX) has been reached while driving round a curve (C).

6. The method according to claim 1, wherein the light interface device (5) is controlled to suggest to the driver the position (AP) that the vehicle (1) should take transversely with respect to the track (T).

7. The method according to claim 1 further comprising an audio system, wherein the audio system emits a sound signal to suggest to the driver in which gear to enter the next curve (C).

8. A road vehicle (1) comprising:
a tracking device (3) configured to identify a current position (AP) and orientation of the road vehicle (1); and
a control unit (4) configured to determine at least partially a conformation of the track (T) on which the road vehicle (1) is located and to identify an optimal trajectory in relation to the conformation of a track (T) and/or the road vehicle (1);
wherein the control unit (4) is configured to determine in use, a relative position (AP) of the road vehicle (1) with respect to the optimum trajectory by identifying a longitudinal relative position (AP) on the optimum trajectory;
the road vehicle (1} comprises a light interface device (5) positioned along an entire periphery of a windshield configured to suggest to the driver one or more actions to be performed to vary a longitudinal dynamic of the road vehicle (1) so as to perform a mission that optimises track performance (T);
wherein the light interface device (5) is configured to emit or assume one or more colours depending on the relative (AP) position of the road vehicle (1);
wherein the interface device is configured to illuminate with a first colour (CO') in an optimal braking zone (BZ), in particular when approaching a curve (C); and
wherein the interface device is configured to illuminate with a second colour (CO") in an optimal partialisation zone (PZ), when exiting a curve (C); and wherein the interface device is configured to illuminate with a third colour (CO''''') in a maximum acceleration zone (AZ), following the zone (PZ) of optimal partialisation and preceding the optimal braking zone (BZ).

9. The road vehicle (1) according to claim 8, wherein the interface device is configured to illuminate with the first colour (CO') approaching the curve (C); and/or
wherein the interface device is configured to illuminate with the second colour (CO") exiting the curve (C); and/or the interface device is configured to illuminate with the third colour (CO'''') following the zone (PZ) of optimal partialisation and preceding the optimal braking zone (BZ).

10. The road vehicle (1) according to claim 8, wherein the light interface device (5) has an elongated shape.

11. The road vehicle (1) according to claim 10, wherein the light interface device (5) is arranged at least along a lower side (8) and/or along the left and right sides of the windscreen (6).

12. The road vehicle (1) according to claim 11, wherein the light interface device (5) is at least partially divided into adjacent sections (11, 12), in particular at the left and right sides of the windscreen (6), which are configured to illuminate with a first colour (CO') progressively or sequentially when approaching the optimal braking zone (BZ).

13. The road vehicle (1) according to claim 8, wherein the light interface device (5) comprises a LED strip.

14. The road vehicle (1) according to claim 8, wherein the light interface device (5) is configured to at least partially colour itself with a fourth colour upon reaching an apex point.

15. The road vehicle (1) according to claim 8, wherein the interface device comprises a head up display, which is configured to primarily colour itself with the first, second or third colours depending on the relative longitudinal position (AP).

* * * * *